Patented Jan. 8, 1924.

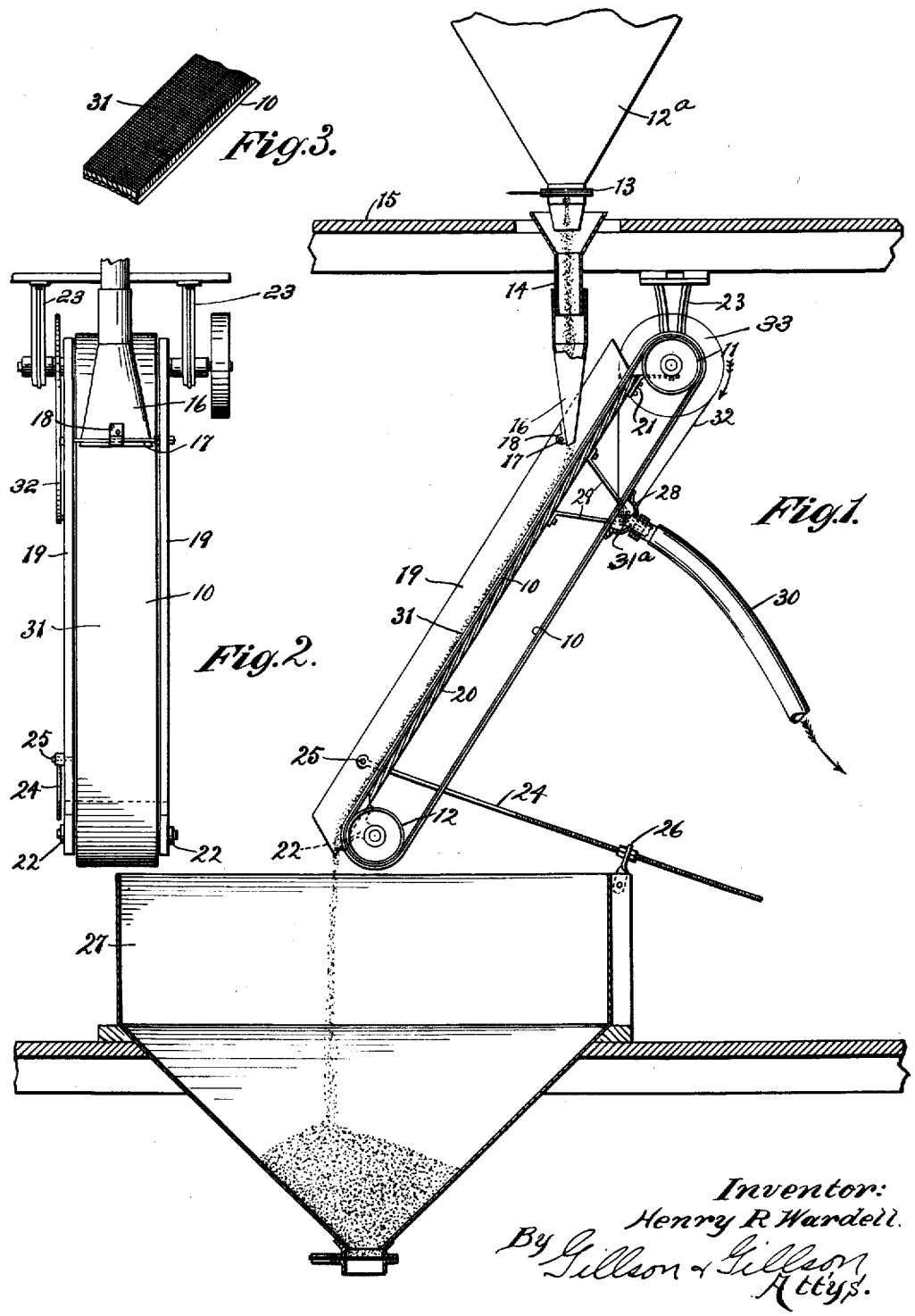

1,480,354

UNITED STATES PATENT OFFICE.

HENRY R. WARDELL, OF NEW YORK, N. Y., ASSIGNOR TO STASO LAMINATED SLATE COMPANY, OF CHICAGO, ILLINOIS, A CORPORATION OF MASSACHUSETTS.

METHOD AND APPARATUS FOR REMOVING DUST FROM ROOFING GRIT.

Application filed September 16, 1919. Serial No. 324,169.

*To all whom it may concern:*

Be it known that I, HENRY R. WARDELL, a citizen of the United States, and resident of New York city, county and State of New York, have invented certain new and useful Improvements in Methods and Apparatus for Removing Dust from Roofing Grit, of which the following is a specification, and which are illustrated in the accompanying drawings, forming a part thereof.

This invention relates to apparatus for cleaning granular material, such as roofing grit, and has for an object the provision of apparatus which will not only remove dust which is loosely associated with the material but also that which may be adhering to the grit particles.

When granular material, especially crushed slate is to be applied to the asphalt surface of prepared roofing, it is extremely important that the surfaces of the granules shall be clean since if they are covered with dust, the asphalt will adhere only to the dust which can easily part from the material causing failure of a permanent binding. Furthermore, cleaning the particles by washing with water is unsatisfactory as the material must be dry when applied to the asphalt and the drying of large quantities of grit is an expensive operation. The present invention accordingly contemplates the removal of dust from the surfaces of granular material in the dry state.

An illustrative embodiment of the invention is shown in the accompanying drawings in which;

Fig. 1 is a vertical longitudinal section through the center of the device,

Fig. 2 is a detail front view of the belt and delivery spout, and

Fig. 3 is a perspective view partly in section showing a detail of the belt.

For the removal of the dust from the surfaces of granular material, the present invention depends upon the brushing action of a belt, as 10, arranged to travel about pulleys, 11, 12 in the direction of the arrow. One of the pulleys, 11, 12 will be driven by power means not shown. In using the apparatus the material to be cleaned will preferably be placed in a hopper 12ª, the outlet of which may be controlled by a sliding gate 13. As shown, the hopper outlet delivers to a spout 14 which may pass through a floor 15 of the building in which the device is installed, to the room below.

The spout 14 preferably terminates in a flattened nozzle, as 16, which should be secured in adjusted fixed relation to the surface of the traveling belt 10, as by a rod passed through a loop 18 secured to the nozzle and through the side boards 19 between which the belt moves.

A bottom board 20 connecting the side boards 19 forms a support for the belt and with the said side boards constitutes a chute to prevent spilling of the granular material. For support of the belt mechanism the bottom board 20 may be hingedly secured to the shaft of pulley 11, as by a strap 21, and brackets 22 to carry the shaft of pulley 12 may be secured to the lower ends of the side boards 19. Hangers 23 supported from the floor 15 serve for supporting the pulley 11.

The brushing of the surfaces of the granular particles and a thorough agitation of the material are accomplished by adjusting the belt 10 to such an inclination that the granular particles will move downward by gravity notwithstanding the upward movement of the belt, while the dust adheres to the belt and is carried upwardly with it. For securing this angular adjustment of the belt mechanism, a rod 24 may be attached to one of the side boards 19, as at 25, and this rod has threaded engagement with a nut 26 which is rotatably mounted on a fixed support. The chute preferably delivers to a hopper 27 from which the clean material can be drawn, as needed.

The method of cleaning the material comprises allowing the material to fall, in a thin sheet, on the belt 10 which is placed at such an angle and driven at such speed that the force of gravity will overcome the carrying tendency of the belt, and the material will flow down the chute into the receiving hopper 27. The belt will not only clean the material by separating the loose dust particles therefrom but if driven at a fairly high rate of speed and its inclination is quite steep it will also polish or brush the surface of the individual particles of said material thereby removing the pulverulent matter adhering thereto.

The belt 10 is preferably surfaced with a layer 31 of material having a pronounced nap, such as carpeting or cocoa matting or a specially constructed fabric of a brushlike character. The dust will thus be received into the nap and thereby be carried upwardly away from the granular material. For cleaning the belt 10 the nozzle, as 28 of a suction tube 30 may be supported against the return length of the belt, as by a bracket 29. If desired a rotary brush 31ª may be associated with the cleaning nozzle 28. When such a brush is used it will be convenient to drive the same with a belt 32 from the spindle of one of the main belt pulleys, as 11.

I claim as my invention—

1. A method of separating pulverulent adhering matter from roofing grit, which consists of contacting the mass of grit and pulverulent matter with a moving adhering surface and thereby simultaneously causing said surface to polish and clean said roofing grit and causing the adherence of said pulverulent matter to said surface, and separately delivering said grit and said pulverulent matter from said surface.

2. A method of separating pulverulent matter from roofing grit which consists of contacting the mass of grit and pulverulent matter with a moving adhering surface for simultaneously separating from the mass of grit pulverulent matter loosely associated therewith and for removing the pulverulent matter adhering to the grit particles and separately delivering said grit and said pulverulent matter from said surface.

3. In a device of the class described, an inclined belt-carrying frame pivotally secured at its upper end to a fixed support, means for adjusting the angularity of said frame relatively to said support, an endless belt on said frame, a hopper, a flattened nozzle for delivering the contents of said hopper on said belt, and means for securing the lower end of said nozzle to said frame in proximity to said belt.

HENRY R. WARDELL.